Jan. 3, 1950 R. BILLGREN 2,493,057
BLAST-PREHEATER
Filed Oct. 23, 1947
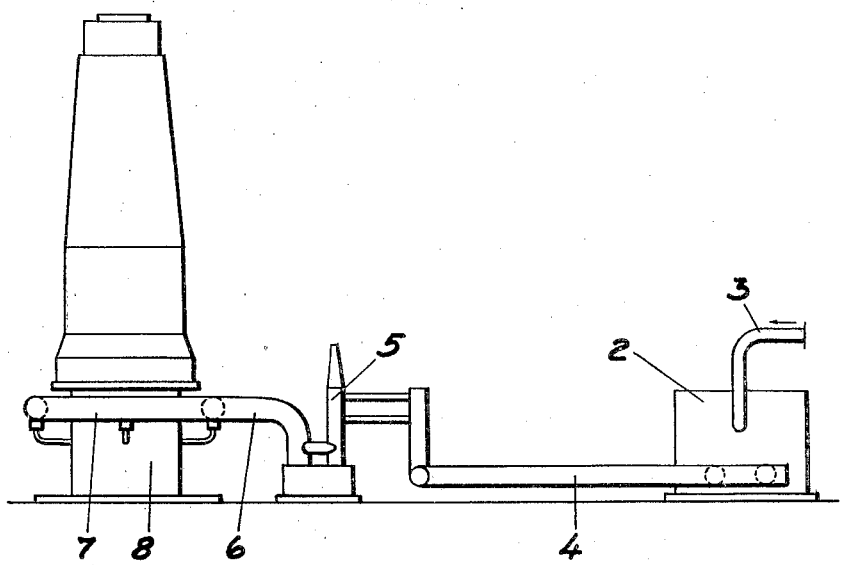
INVENTOR
RUNE BILLGREN
BY Otto Munk
HIS ATT'Y Patented Jan. 3, 1950

2,493,057

UNITED STATES PATENT OFFICE 2,493,057

BLAST PREHEATER

Rune Billgren, Fagersta, Sweden

Application October 23, 1947, Serial No. 781,521
In Sweden February 1, 1946

Section 1, Public Law 690, August 8, 1946
Patent expires February 1, 1966

4 Claims. (Cl. 219—39)

In metallurgical as well as in other furnaces where high temperatures are to be obtained with the use of fuel as cheap as possible, preheating of the combustion air or the combustion gas, or of both, has proved to be the best means for an economically sound solution of the problem. Here, the heat of flue gases escaping from the furnace is utilized and transferred to the combustion air by recuperative or regenerative means. If the furnace yields combustible gases, the latter are used for the preheating, the same being combusted in recuperative or regenerative heating apparatuses, in which the heat is also transferred to combustion air or combustion gas. In these heating apparatuses, the gases are preferably heated to 400–600° C., where recuperative preheaters are being used, and to higher temperatures, 600–1000° C., in heating apparatuses of the regenerative type. The preheating might, perhaps, be extended further than stated above, but in that case such further preheating will take place at the cost of the heat exchange, that is to say, the efficiency is rendered inferior. In those cases where the gases escaping from the furnace are insufficient or valuable per se, as in a blast-furnace, for example, good efficiency of the preheating apparatus is obviously of great economical importance. Other difficulties met with in the preheating according to principles already applied are the risk of a chemical attack on the tube material of tubular apparatuses by the combustion products of the gas, particularly by sulphur, and the risk of nitration under the influence of the nitrogen of the flue gases. Purely mechanical strains are also difficult to cope with. The heated medium frequently has a comparatively high pressure. The regenerative heating apparatuses require, as a rule, much space and involve high erection costs. The difficulties mentioned herein are augmented with an increased preheating temperature.

The present invention has for its object to eliminate the difficulties encountered in preheating apparatuses already made use of in practical operation, and the invention primarily aims at bringing about preheating of the blast-air to temperatures above 500–600° C., but by reason of the small space required by the apparatus, the invention may also be used to advantage in connection with lower preheating temperatures. The invention solves the preheating problem in the following manner:

A blast-preheater device according to the invention is illustrated diagrammatically by way of example in one embodiment in the accompanying drawing.

2 designates a low temperature part located at a certain distance from the furnace, in which part the preheating takes place thermically in recuperative tubular heating apparatus of known type and in which the blast-air supplied through a pipe 3 is heated to 400–600° C., or so far that the heating takes place economically. From the low temperature part the blast-air thus heated is passed through a conduit 4 to a high temperature part 5 adjacent the furnace, in which part the blast-air is heated electrothermically in a high tension arc to the desired temperature or 800–900° C. The high temperature part may be arranged for heating the blast-air by high tension arc to a temperature of 2000° C. From a high temperature part the hot blast-air is led through a conduit 6 to the ring drum 7 and the furnace 8.

It may be noted in this connection that, while it is true that preheating of air or gases has been suggested previously to be effected with the aid of a preheating system divided into a high temperature part and a low temperature part the heating of the high temperature part has not taken place by electro-thermic means according to said known proposition. Nor has the succession between the two parts been the same as in the present case.

As a suitable suggestion for a form of embodiment of the arrangement according to the invention, one may make use of the known Schönherr-furnace, which is constituted by an electric high tension arc furnace with a cylindrical furnace space permitting of being disposed vertically or at an incline, and wherein the air is supplied at the top so as to have a tangential motion down through the shaft imparted thereto. A high tension arc passes from a top electrode to a bottom electrode, the central portion thereof being thus caused to develop an intense heat. In a furnace of this type of 300 kw., the height of the furnace will be 2.5 meters, for example. The dimensions to be considered are thus comparatively small, the advantage being also gained that the preheater may be placed in the proximity of the main furnace proper and may, if so desired, be built together with the latter.

According to a suitable embodiment, the blast pipes of the furnace are formed so as to constitute at the same time the high temperature part of the preheating apparatus.

The substantial feature of the novel arrangement resides in a suitable selection of preheating units. By the high efficiency obtained in an electro-thermic preheating apparatus according to the invention, it is justified to make use of the comparatively expensive electrical energy for the preheating of blast-air. Hitherto, inferior fuel has been used to a preponderant extent for this purpose.

A preheater has been described in the foregoing, said preheater making a blast-preheating possible to a high or very high temperature without the dimensions of the heater being too large. If the high temperature part is built together with the main oven the efficiency will be the best possible and furthermore the problem concerning hot blast-pipes for high temperatures disappears.

From the metallurgical point of view a high blast-temperature offers great advantages when blast-furnaces are used. In many cases it is however better to use a blast of high temperature than a blast enriched with oxygen as has been suggested many times for improving the blast furnace process. This is especially the case at blast-furnaces in which the coal-consumption is already favourable.

Furthermore a blast of high temperature makes possible the use of other fuels in the blast-furnace than those used nowadays. All the advantages mentioned above are worthy of attention.

Having now described my invention, what I claim as new and desire to secure by Letters Patent is:

1. A blast-preheater comprising a low temperature part for thermically preheating blast-air up to 400 to 600° C., and a high temperature part separate from the low temperature part, said high temperature part having electro-thermic means for heating said blast-air in said high temperature part to a temperature above 600° C.

2. A pre-heater as claimed in claim 1, in which the high temperature part is heated by means of a high tension electric arc used as the electro-thermic heat source.

3. A pre-heater as claimed in claim 1, in which the high temperature part is located close to and built together with the furnace proper.

4. A pre-heater as claimed in claim 1, in which the blast pipes of the furnace and the high temperature part constitute a unit.

RUNE BILLGREN.

REFERENCES CITED

The following references are of record in the file of this patent:

UNITED STATES PATENTS

| Number | Name | Date |
| --- | --- | --- |
| 1,060,957 | Spaulding | May 6, 1913 |
| 1,106,166 | Testrup et al. | Aug. 4, 1914 |
| 1,294,756 | Benjamin | Feb. 18, 1919 |
| 1,430,971 | Fournander | Oct. 3, 1922 |
| 1,996,680 | Lobley | Apr. 2, 1935 |
| 2,115,586 | McFarland | Apr. 26, 1938 |
| 2,177,258 | Jares | Oct. 24, 1939 |